United States Patent Office 3,557,219
Patented Jan. 19, 1971

3,557,219
PROCESS FOR PREPARING ALCOHOLS
AND ALDEHYDES
Lawrence J. Kehoe, Huntington Woods, and Raymond
A. Schell, Berkley, Mich., assignors to Ethyl Corporation, New York, N.Y., a corporation of Virginia
No Drawing. Filed Apr. 15, 1968, Ser. No. 721,187
Int. Cl. C07c 45/10
U.S. Cl. 260—604     22 Claims

ABSTRACT OF THE DISCLOSURE

A process is described for preparing alcohols, aldehydes, and mixtures thereof, by reacting olefins, carbon monoxide and water using metallic rhodium as the catalyst. The reaction is carried out at elevated temperatures (to about 300° C.) and under pressures above atmospheric (to 20,000 p.s.i.).

The alcohols and/or aldehyde produced contain one carbon atom more than the starting olefin; they are especially useful as solvents and intermediates for the preparation of carboxylic acids for example.

BACKGROUND OF THE INVENTION

The preparation of aldehydes and alcohols by the reaction of an olefin with carbon monoxide and hydrogen using a cobalt containing catalyst is well known in the art. This reaction is commonly known as the oxo or Roelen reaction.

The reaction of an olefin with carbon monoxide and water, on the other hand using a cobalt carbonyl oxo catalyst, nickel carbonyl or iron carbonyl is known to produce carboxylic acids; U.S. 2,448,368, U.S. 2,593,440 and R. Ercoli, Chem. Ind. (Milan) 37 (13) 1029–32 (1955).

The reaction of an olefin with carbon monoxide and water has also been shown to produce alcohols when carried out using an iron carbonyl/tertiary amine complex catalyst. This is known as the Reppe synthesis; Liebig's Ann. Chem., 582, 133 (1953).

Both the oxo and Reppe synthesis are used commercially for preparing alcohols. In each case a complex carbonyl containing catalyst is used.

We have discovered that by using a very simple catalyst system (rhodium metal on a carrier) both alcohols and aldehydes can be prepared, from the reaction of an olefin, carbon monoxide and water. Not only is the catalyst system simple, but using this catalyst system either alcohol or aldehyde formation can be favored by properly adjusting reaction parameters, and especially the reaction temperature. Thus, the simplicity of the catalyst system coupled with the product control feature of the process offer outstanding advantages to the chemical process art.

SUMMARY OF THE INVENTION

A process for preparing organic compounds selected from alcohols, aldehydes and mixtures thereof which comprises reacting $C_2$–$C_{40}$ olefins with carbon monoxide and water using a catalytic quantity of a catalyst which consists essentially of rhodium metal on a carrier, said reaction being carried out at temperatures of up to about 300° C. and pressures of up to about 20,000 p.s.i.

Rhodium on carbon is an especially effective catalyst.

DESCRIPTION OF THE PREFERRED EMBODIMENTS

The present invention is embodied in a process for preparing an aldehyde, alcohol and/or a mixture thereof by reacting a $C_2$–$C_{40}$ olefin with carbon monoxide and water using a catalytic quantity of a catalyst which consists essentially of rhodium on a carrier, at temperatures up to 300° C. and pressures up to about 20,000 p.s.i. In another embodiment, the process described above is carried out in an alkyl ether having up to 16 carbon atoms, a di-$C_1$–$C_5$-alkyl ketone or mixtures thereof. In a preferred embodiment, the process is carried out using rhodium on a carrier such as carbon black, charcoal and the like, as the catalyst. Other preferred embodiments are the process described above (a) carried out at a temperature of from about 150° C. to about 300° C. and (b) carried out at a pressure of from 500 p.s.i. up to 20,000 p.s.i. In still another embodiment, the olefin in the process is an α-olefin having from about 6 to about 24 carbon atoms.

Another especially preferred embodiment is the process described above wherein alcohols predominantly are prepared by maintaining the reaction temperature at about 175° C.; in a similarly preferred embodiment, predominantly aldehydes are prepared by carrying out the process described above at a reaction temperature no greater than about 160° C.

Other preferred embodiments will be described in examples below.

Organic compounds which are useful reactants in the practice of this invention are unsaturated compounds having at least one non-aromatic carbon-to-carbon double bond and containing up to about 40 carbon atoms. These compounds include monounsaturates, that is, compounds having one carbon-to-carbon double bond, as well as polyunsaturates, that is, compounds having two or more carbon-to-carbon double bonds. Preferred unsaturated organic compounds are the olefins. By olefins, we means unsaturated hydrocarbons having at least one carbon-to-carbon double bond. Examples of useful olefins are ethylene, octene-2, pentadecene-3, hexadiene-2,4, tetraisobutylene, cyclooctene, cyclooctadiene-1,5, dodecene-2, eicosene-3, nonene-4, octadecene-5, triisobutylene, 2-ethylhexene-1, cyclohexene, tetracosene-1,5, octadecadiene-1,6, undecadiene-1,4, hexene-1, tetradecene-1. Preferred olefins are the monoolefins. Examples of useful monoolefins are hexene-3, octene-2, nonene-1, decene-3, tetradecene-4, dodecene-2, tetracosene-1, pentadecene-1, nonadecene-1, heptadecene-1, 2-methylheptene-1, diisobutylene, eicosene-1, and the like.

Commercial mixtures of olefins are also quite useful. These commercial mixtures are generally a mixture of various homologous olefins such as $C_6$, $C_8$, $C_{10}$ olefins; $C_2$, $C_4$ olefins; $C_{13}$, $C_{15}$, $C_{17}$ olefins; $C_{11}$, $C_{12}$, $C_{13}$, $C_{14}$, $C_{15}$ olefins; $C_{18}$; $C_{20}$, $C_{22}$ olefiins; $C_{30}$, $C_{40}$ olefins and the like. These mixed olefins are synthesized for example by the Ziegler catalyzed polymerization of low molecular weight olefins such as ethylene or propylene; or by the dehydrogenation of suitable paraffins. The mixed olefins thus obtained might also contain minor amounts of other non-homologous olefins and non-olefin components. In any case, the mixed product obtained from such a commercial synthesis need not be separated into the individual components to be useful. Mixtures containing $C_6$–$C_{24}$ mono-olefins primarily, are especially useful.

The catalyst which is used in the present invention consists essentially of metallic rhodium on a carrier. By "consisting essentially of" we means in the substantial absence of any metal carbonyl. Molecular sieves, various forms of alumina, clays, kieselguhr, silica and the like are commonly used carriers for catalysts. Carbon, in forms such as charcoal, carbon black, and the like, is an especially useful carrier for rhodium in the present process.

In preparing the rhodium-on-carrier catalyst, the metal may be deposited by any general means known in the art. Thus, it may be deposited on the carrier by reducing a rhodium compound in solution in the presence of carbon; rhodium may be physically blended with the carrier and used as a powder; or compressed into pellets and the like. Other methods of impregnating the inert carrier with rhodium recognized by those skilled in the art may be used.

Finely divided rhodium metal may also be used as the catalyst.

The concentration of rhodium on the carrier can be varied. Generally, a carrier having from about 0.01 to about 50 percent by weight of rhodium therewith can be used. Rhodium metal concentrations on the carrier of from 0.01 to about 10 percent are conveniently used.

In carrying out the reaction, an amount of catalyst sufficient to initiate and continue the reaction under the conditions herein described is used. The catalyst used should provide at least about $1 \times 10^{-6}$ moles of rhodium per mole of olefin. Concentrations ranging from about $1 \times 10^{-6}$ to about $1 \times 10^{-1}$ moles of rhodium per mole of olefin are conveniently used. Higher concentrations of rhodium may also be used if desired.

The amount of water which is used in carrying out the process of this reaction may vary over a wide range. Since water enters into the reaction with the olefin and carbon monoxide, it is desirable to have at least the stoichiometric amount of water present when running the reaction. In general, amounts of water sufficient to have an olefin: water molar ratio of from about 1:1 to about 1:10 are used. Olefin: water molar ratios of from about 1:1 to about 1:5, are conveniently used. Since the olefins, especially the higher olefins and water are relatively immiscible, it is advantageous to stir the mixture during the reaction process.

As pointed out above, it is preferred to carry the process out in the presence of a promoter. The promoter generally increases the rate of the present reaction.

Suitable promoters are generally organic compounds of the ketone or ether class. Typical promoters are the alkyl ketones having up to about 11 carbon atoms such as diisobutyl ketone, cyclohexanone, methylethyl ketone, methylisobutyl ketone, diamyl ketone, cyclohexyl ethyl ketone and the like; and alkyl ethers having from 4 to about 16 carbon atoms such as diethyl ether, 1,4-dioxane, di-n-butylether, di-n-hexylether, di-2-ethylhexyl ether, di-$C_1$-$C_4$-alkyl glycol ethers and polyethers such as 1,2-diethoxy ethane, bis[2-(2-methoxyethoxy)ethyl]ether, bis-(2-butoxyethyl)ether, 1,2-dipropoxy propane, 1,2-bis[2-(2-methoxyethoxy)ethyl]ethane and the like. Mixtures of the promoter compounds can also be used.

Especially preferred promoters are acetone and 1,2-di-methoxy ethane.

The quantity of promoter used can range from about 0.5 up to 20 times the amount of olefin used. Generally promoter to olefin weight ratios of 5 to 1 down to 0.5 to 1 are used. Greater or lesser amounts of promoter can also be used.

Since the third reactant in the process is carbon monoxide (CO), the process of the present invention is carried out at pressures above atmospheric. The pressure is that due for the most part to the carbon monoxide. CO pressures ranging up to about 20,000 pounds per square inch (p.s.i.) are conveniently used. CO pressures ranging from about 1,000 p.s.i. to about 15,000 p.s.i. can be used. The pressure is not critical except that at least a stoichiometric amount of CO should be supplied to the system.

The temperature at which the reaction is carried out generally ranges from about 75° C. up to about 300° C. Although the temperature at which the reaction is carried out is not critical in the general sense of the word, there are temperature limits at which primarily aldehyde or alcohol are produced. Temperatures above about 175° C. favor the production of alcohol. Temperatures below about 165° C. favor the production of aldehyde. The effect of temperature on favoring either aldehyde or alcohol formation is to a certain degree dependent upon other parameters such as time, pressure and the nature of the olefin used. Their interrelationship will be made more evident by the examples below.

The products obtained in the present process generally are mixtures of isomers of alcohols and/or aldehydes. The alcohols and/or aldehydes have one more carbon atom than the starting olefin. The following equation illustrates the reaction. Tetradecene-1 is used as an example of a typical olefin.

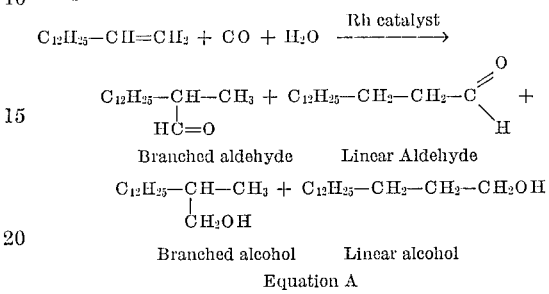

Equation A

The weight ratio of linear to branched products ranges in general from about 50/50 to about 30/70. In other words if the product obtained is 100 percent aldehyde, then from 30 to about 50 percent of this aldehyde will be the linear aldehyde, while the remainder will be the branched isomer; and likewise where both alcohol and aldehyde are present, linear and branched isomers of both the alcohol and of the aldehyde will each be found in ratios disclosed above.

In the following examples, all parts are by weight unless otherwise specified. Conversion is the measure of olefin which reacts. It is calculated as follows:

Percent conversion $$= \frac{\text{Olefin charge} - \text{olefin recovered}}{\text{Olefin charge}} \times 100$$

The yield is the percent of alcohol or aldehyde product obtained. It is calculated as follows:

Percent yield $$= \frac{\text{Alcohol or Aldehyde (moles)}}{\text{Olefin charge} - \text{olefin recovered (moles)}} \times 100$$

EXAMPLE 1

An autoclave having a magnetic stirrer was charged with 46.1 parts of dodecene-1, about 96 parts of acetone, about 25 parts of water and 3 parts of 5 percent rhodium (by weight) on carbon. Carbon monoxide was introduced to a pressure of 2,000 p.s.i. The mass was then heated to 175° C., and the reaction was continued at this temperature for 24 hours. The pressure drop noted at the end of this time was 500 p.s.i.

The autoclave was cooled and vented. The product obtained was 155.3 parts of a red-black liquid. Analysis via vapor phase chromatography showed 100 percent conversion of olefin charged. The yield, based on this conversion, was 90 percent $C_{13}$ alcohol and 0 percent aldehydes.

EXAMPLE 2

An autoclave having a magnetic stirrer was charged with 46.4 parts of dodecenes, about 96 parts of acetone, about 24 parts of water and 3 parts of 5 percent rhodium (by weight) on carbon. Carbon monoxide was introduced to a pressure of 2,000 p.s.i. The mass was then heated to 200° C., the pressure reading rising to 3,500 p.s.i. The reaction was continued at this temperature for 21 hours. The pressure drop recorded at the end of this time was 1,000 p.s.i.

The autoclave was cooled and vented. The product obtained was 148.7 parts of a black solution. Analysis via vapor phase chromatography showed 98 percent conversion of olefin charged. The yield, based on this conversion, was 65 percent $C_{13}$ alcohol, and 19 percent $C_{13}$ aldehyde.

Similar results are obtained when 19, 38, 200, 500 or 800 parts of acetone are used in the Example 2 reaction.

EXAMPLE 3

An autoclave having a magnetic stirrer was charged with 40.1 parts of hexene-1, about 96 parts of acetone, about 24 parts of water and 3 parts of 5 percent rhodium (by weight) on carbon. Carbon monoxide was introduced to a pressure of 2,000 p.s.i. The mass was then heated to 175° C.; the reaction was continued at this temperature for about 24 hours. At the end of this time, the autoclave was cooled and vented. The product obtained was 146.8 parts of a black solution. Analysis via vapor phase chromatography showed 98 percent conversion of olefin charged. The yield, based on this conversion, was 81 percent $C_7$ alcohol, 15 percent $C_7$ aldehyde.

EXAMPLE 4

An autoclave having a magnetic stirrer was charged with 38 parts of hexene-1, about 96 parts of acetone, about 24 parts of water and 3 parts of 5 percent rhodium (by weight) on carbon. Carbon monoxide was introduced to a pressure of 2,000 p.s.i. The mass was then heated to 200° C., the pressure rising to 3,500 p.s.i. The reaction was continued at this temperature for 21 hours. The pressure drop recorded at the end of this time was 1,000 p.s.i.

The autoclave was cooled and vented. The product obtained was 148.7 parts of a black solution. Analysis via vapor phase chromatography showed 98 percent conversion of olefin charged. The yield, based on this conversion, was 72 percent $C_7$ alcohol, 14 percent $C_7$ aldehyde.

EXAMPLE 5

An autoclave having a magnetic stirrer was charged with 39.7 parts of hexene-1, about 96 parts of acetone, about 24 parts of water and 3 parts of 5 percent rhodium (by weight) on carbon. Carbon monoxide was introduced to a pressure of 2,000 p.s.i. The mass was then heated to 250° C.; the reaction was continued at this temperature for 12 hours.

The autoclave was cooled and vented. The product obtained was 145.2 parts of a black solution. Analysis via vapor phase chromatography showed 66 percent conversion of olefin charged. The yield, based on this conversion, was 48 percent $C_7$ alcohol, 28 percent $C_7$ aldehyde.

EXAMPLE 6

An autoclave having a magnetic stirrer was charged with about 13.4 parts of hexene-1, 19.1 parts of acetone, 8 parts of water and 1 part of 5 percent rhodium (by weight) on carbon. Carbon monoxide was introduced to a pressure of 2,000 p.s.i. The autoclave was then heated to 70°, 100° and 130° C. and kept at each temperature for 20 minutes. The autoclave was finally heated to 150° C. and the reaction was continued at this temperature for 16.5 hours.

The autoclave was cooled and vented. The product obtained was 51.6 parts of a red-brown solution. Analysis via vapor phase chromatography showed 52 percent conversion of olefin charged. The yield, based on this conversion, was 100 percent $C_7$ aldehyde.

EXAMPLE 7

A rocking autoclave was charged with 13.2 parts of hexene-1, about 30.5 parts of acetone, 8 parts of water and 1 part of 5 percent rhodium (by weight) on carbon. Carbon monoxide was introduced to a pressure of 12,150 p.s.i. The mass was then heated to 160° C., the pressure reading rising to 16,400 p.s.i. The reaction was continued at this temperature for 3.5 hours. The pressure drop recorded at the end of this time was 4,100 p.s.i.

The autoclave was cooled and vented. The product obtainned was 35.2 parts of a black solution. Analysis via vapor phase chromatography showed 100 percent conversion of olefin charged. The yield, based on this conversion was 8 percent $C_7$ alcohol, and 89 percent $C_7$ aldehyde.

EXAMPLE 8

An autoclave having a magnetic stirrer was charged with 15.2 parts of hexene-1, 31 parts of acetone, 8 parts of water and 1 part of 5 percent rhodium (by weight) on carbon. Carbon monoxide was introduced to a pressure of 2,000 p.s.i. The mass was then heated to 160° C., the pressure reading rising to 3,000 p.s.i. The reaction was continued at this temperature for 24 hours. During the course of the reaction an additional 725 p.s.i. of CO was introduced.

The autoclave was cooled and vented. The product obtained was 41.7 parts of a red-brown solution. Analysis by vapor phase chromatography showed 85 percent conversion of olefin charged. The yield, based on this conversion, was 2 percent $C_7$ alcohol and 88 percent $C_7$ aldehyde.

EXAMPLE 9

An autoclave having a magnetic stirrer was charged with 68 parts of hexene-1, about 48 parts of water and 3 parts of 5 percent rhodium (by weight) on carbon. Carbon monoxide was introduced to a pressure of 2,000 p.s.i. The autoclave was then heated to 200° C.; the reaction was continued at this temperature for 21 hours. The pressure drop recorded at the end of this time was 275 p.s.i.

The autoclave was cooled and vented; 122.8 parts of liquid product was obtained. Analysis via vapor phase chromatography showed 35 percent conversion. The yield based on this conversion, was 36 percent $C_7$ alcohol, 31 percent $C_7$ aldehyde and trace amounts of acids and hexane.

Data from Examples 1–9 is collated in the following table:

TABLE 1

|  | Olefin | Olefin:H₂O (Molar ratio) | Promoter | CO, p.s.i. | Temperature, °C. | Conversion, percent | Yield Aldehyde, percent | Yield Alcohol, percent |
|---|---|---|---|---|---|---|---|---|
| Example [1]: | | | | | | | | |
| 1 | 1-dodecene | 1:5:1 | Acetone | 2,000 | 175 | 100 | 0 | 90 |
| 2 | Dodecenes [2] | 1:4:8 | do | 2,000 | 175 | 98 | 19 | 65 |
| 3 | 1-hexene | 1:2:8 | do | 2,000 | 175 | 98 | 15 | 81 |
| 4 | do | 1:2:9 | do | 2,000 | 200 | 98 | 14 | 72 |
| 5 | do | 1:2:9 | do | 2,000 | 250 | 66 | 28 | 48 |
| 6 | do | 1:2:8 | do | 2,000 | 150 | 52 | 100 | 0 |
| 7 | do | 1:2:8 | do | 12,150 | 160 | 100 | 89 | 2 |
| 8 | do | 1:2:4 | do | 2,000 | 160 | 85 | 88 | 2 |
| 9 | do | 1:3:2 | None | 2,000 | 200 | 35 | 31 | 36 |

[1] A commerical 5% rhodium on carbon catalyst was used in each example.
[2] Mixed isomers containing: 2% 1-dodecene, 25% 2-dodecene, 20% 3-dodecene, 53% other internal isomers.

The data in Table 1 shows that aldehydes and/or alcohols are prepared in good yields using the process of the present invention. The important effect of temperature favoring aldehyde or alcohol formation is clearly brought out. Examples 1–5 and 9 show that at reaction temperatures above about 175° C., the alcohol product predominates. With 1-dodecene at 175° C. (Example 1), alcohol with substantially no aldehyde was the product obtained. At temperatures below about 175° C., aldehyde formation is favored (Examples 6–9). The product obtained from 1-hexene at 150° C. was a mixture of $C_7$ aldehydes with substantially no $C_7$ alcohol (Example 6).

Although as pointed out above, the promoter is not required in the process, its use does improve the rate of the reaction. This can be seen by comparing Example 4 with Example 9. When acetone was used as a promoter, the conversion of 1-hexene at 200° C. was 98% (Example 4); without acetone (Example 9), under essentially the same reaction conditions, 1-hexene conversion was 35%. Thus, the use of a promoter does offer a measurable advantage.

As disclosed above preferred unsaturated organic compounds are olefins containing from 2 to about 40 carbon atoms. Additional examples of useful olefins are 1,7-octadiene, cyclooctatriene-1,5, 1,5-pentadiene, 1,9-heptadecadiene, 1,6-tetracosadiene, 1,13-tetradecadiene, $C_{40}$-diene, $C_{30}$-diene, hexene-2, propylene, heptene-2, cyclooctene, butene-1, dodecene-2, 4,6,6-trimethylheptene-1, dodecene-2, eicosene-3, nonene-3, nonene-4, 2-methylhexene-1, hexadecene-5, tetracosene-1, $C_{30}$-monoolefin, $C_{40}$-monoolefin, propylene trimer, propylene tetramer, 2-methylbutene-1, 1,3-butadiene, dicyclopentadiene, 1,6,8-octadecatriene, $C_{30}$-monoolefin, $C_{40}$-diolefin, isoprene, 1,3-dodecadiene, 1,3-tetracosadiene and the like.

Unsaturated compounds which contain other functional groups such as hydroxy, halogen, nitro and the like are also useful in the present process. Where these other functional groups are present in the unsaturated organic compound they must be in a position relative to the carbon-to-carbon double bond such that these functional groups do not adversely affect the reaction in the present process. Examples of these types of unsaturated organic compounds are 4-chlorooctene-1, oleic acid, 9-hydroxytetradecene-1, 4-nitrododecene-2, styrene, and the like.

The process of the present invention is further illustrated in the following examples. All parts are by weight.

EXAMPLE 10

An autoclave fitted with a stirrer is charged with 280 parts of 1-eicosene, 280 parts of methylisobutyl ketone, 18 parts of water and 10 parts of 1 percent Rh on carbon. Carbon monoxide is introduced into the autoclave to a pressure of 1000 p.s.i. The vessel is heated to 200° C. and reaction is continued with stirring at this temperature for 10 hours.

At the end of this time, the vessel is cooled and vented. A good yield of $C_{21}$ alcohols and aldehydes is obtained. The $C_{21}$ alcohols are the predominant product.

EXAMPLE 11

An autoclave is charged with 252 parts of 1,4-octadiene, 1764 parts of 1,2-dibutoxy ethane, 36 grams of water and 5 parts of 2 percent rhodium on carbon black. Carbon monoxide is introduced into the vessel to a pressure of 5,000 p.s.i. The vessel is heated to 125° C. and the reaction is continued with stirring at this temperature for 20 hours.

At the end of this time the vessel is cooled and vented. The product obtained is a mixture of $C_{19}$ monounsaturated and fully saturated aldehydes and alcohols and $C_{20}$ saturated diols and dialdehydes. The aldehydes are the predominant product.

Similar results are obtained if 1,7-octadiene is used as the olefin reactant.

The reaction of Example 11 also proceeds in a similar manner when 20 percent rhodium on carbon, 0.2 percent rhodium on carbon or 0.02 percent rhodium on carbon black is used in place of 2 percent rhodium on carbon.

EXAMPLE 12

An autoclave fitted with a stirrer is charged with 336 parts of 1-tetracosene (50 percent branched-50 percent linear), 3,360 parts of methylethyl ketone, 54 parts of water and 130 parts of 8 percent rhodium on carbon. Carbon monoxide is introduced into the vessel to a pressure of 4,000 p.s.i. The vessel is heated to 185° C. and the reaction is continued with stirring at this temperature for 30 hours. At the end of this time, the autoclave is cooled and vented. A good yield of $C_{25}$ aldehydes and alcohols is obtained. The $C_{25}$ alcohol is the predominant product. Similar results are obtained when carbon monoxide pressures of 500, 1,500, 2,000, 6,000, 12,000 and 20,000 p.s.i. are used in Example 12.

EXAMPLE 13

An autoclave fitted with a stirrer is charged with 182 parts of 1-tridecene, 910 parts of 1,4-dioxane, 27 parts of water and 10 parts of 10 percent rhodium on carbon. Carbon monoxide is introduced into the autoclave to a pressure of 750 p.s.i. The vessel is heated to 100° C. and the reaction is continued with stirring at this temperature for 40 hours.

At the end of this time, the autoclave is cooled and vented. A good yield of $C_{14}$ alcohols and aldehydes is obtained. The $C_{14}$ aldehyde is the predominant product. Similar results are obtained when diisopropyl ether, diethyl ether, dicyclohexyl ether cyclohexanone, tetrahydrofuran or 1,3-dioxane is used instead of the 1,4-dioxane in Example 13.

The reaction of Example 13 proceeds in a similar manner when 10 parts of 10 percent rhodium on alumina, 5 parts of 3 percent rhodium on silica or 1 part of powdered rhodium metal is used as the catalyst.

EXAMPLE 14

An autoclave fitted with a stirrer is charged with 224 parts of 1-hexadecene, 108 parts of water, 112 parts of diamyl ketone and 1 part of 0.01% rhodium on carbon. Carbon monoxide is introduced into the vessel to a pressure of 2,000 p.s.i. The vessel is heated to 160° C. and the reaction is continued with stirring at this temperature for 8 hours.

At the end of this time, the autoclave is cooled and vented. A good yield of $C_{17}$ aldehydes and alcohols is obtained. The $C_{17}$ aldehydes are the predominant product.

Similar results are obtained when diamyl ketone is replaced with diethyl ketone, ethylbutyl ketone, methyl-n-octyl ketone, methylisobutyl ketone or diisopropyl ketone in Example 14.

EXAMPLE 15

An autoclave fitted with a stirrer is charged with 139 parts of 1,3-decadiene, 417 parts of bis[2(2-ethoxyethoxy)ethyl]ether, 72 parts of water and 0.012 part of 6% rhodium on carbon. Carbon monoxide is introduced into the vessel to a pressure of 3,000 p.s.i. The autoclave is heated to 180° C. and the reaction is continued at this temperature with stirring for 12 hours.

At the end of this time, the autoclave is cooled and vented. The product obtained contains $C_{11}$ alcohols and aldehydes and $C_{12}$ diols and dialdehydes. The aldehydes are the predominant product.

Similar results are obtained when bis[2(2 - ethoxyethoxy)ethyl]ether in Example 15 is replaced with 1,2-diethoxy ethane, bis[2 - (2 - methoxyethoxy)ethyl]ether, 1,2-dipropoxy propane, or bis(2-butoxyethyl)ether.

EXAMPLE 16

An autoclave fitted with a stirrer is charged with 112 parts of mixed octenes (40%-1-octene, 40%-2-octene, 18%-3-octene, 2%-other octene isomers), 224 parts of diisobutyl ketone, 90 parts of water and 20 parts of 0.1% rhodium on carbon. Carbon monoxide is introduced into the autoclave to a pressure of 7,000 p.s.i. The autoclave is heated to 75° C. and the reaction is continued at this temperature with stirring for 40 hours.

At the end of this time, the autoclave is cooled and vented. A good yield of $C_9$ aldehydes and alcohols are obtained. The $C_9$ aldehydes are the predominant product.

Butene yields pentanals and pentanols, 1,4-pentadiene yields hexanols and hexanals, 2-undecene yields dodecanols and dodecanals, 3-hexane yields heptanals and heptanols, ethylene yields propanols and propanals, when these olefins are used in place of the octenes in Example 16.

EXAMPLE 17

An autoclave fitted with stirrer is charged with 420 parts of tricontene, 630 parts of bis(2-methoxyethyl)ether, 63 parts of water and 0.2 part of 50% rhodium on carbon. Carbon monoxide is introduced into the autoclave to a pressure of 20,000 p.s.i. The vessel is heated to 300° C. and the reaction is continued at this temperature with stirring for 7 hours.

The vessel is then cooled and vented. A good yield of $C_{31}$ alcohols and aldehydes are obtained. The $C_{31}$ alcohols are the predominant product.

EXAMPLE 18

An autoclave fitted with a stirrer is charged with 82 parts of cyclohexene, 1640 parts of acetone, 81 parts of water and 50 parts of 9% rhodium on charcoal. Carbon monoxide is introduced into the autoclave to a pressure of 1500 p.s.i. The autoclave is heated to 160° C. and the reaction is continued at this temperature for 2 hours.

At the end of this time, the autoclave is cooled and vented. The product obtained contains cyclohexyl carbinol and cyclohexyl aldehyde. The aldehyde is the predominant product.

When the reaction temperature in Example 18 is raised to 225° C., the cyclohexyl carbinol is the predominant product.

When the present process is carried out adding a small amount of an organic phosphine or phosphite to the system, there is a noticeable increase in the rate of carbon monoxide uptake. This indicates an improved reaction rate.

Thus, another embodiment of the present invention is the process described above wherein a small amount of an organic phosphine or phosphite activator is added to the system. The amount of activator added is based on the number of moles of rhodium present. Molar ratios of phosphine or phosphite activator to rhodium ranging from 1:1 to 10:1 can be used. Phosphine or phosphite to rhodium molar ratios of from 1:1 to about 5:1 are conveniently used. In general, trialkyl-, triaryl- and mixed alkyl aryl phosphites and phosphines are useful activators. Phosphites and phosphines wherein the aryl or alkyl substitutes have up to about 8 carbon atoms are especially useful. Examples of suitable phosphites and phosphines are trimethyl phosphite, tris(2-ethyl-n-hexyl)phosphite, triphenyl phosphite, tritolyl phosphite, trixylyl phosphite, diphenyl methyl phosphite, di-n-butyl tolyl phosphite, tri-n-butylphosphine, tri - n - hexylphosphine, triphenylphosphine, tris(p-methoxyphenyl)phosphine, diethylphenylphosphine, ditolyl-n-pentylphosphine and the like.

The products obtained from the process of the present invention have myriad uses in the chemical field. The alcohols, for example, are useful as solvents and as chemical intermediates used in the preparation of esters; the higher molecular weight alcohols are especially useful as detergent intermediates. The aldehydes likewise are useful, for example, as solvents and as chemical intermediates especially for the preparation of acids. The aldehydes can also be used to react with amines to produce useful rubber antioxidants.

In general, the products are mixtures of alcohol isomers and/or aldehyde isomers. These mixtures may be used as such; or if desired, they may be separated into their components. Any method of separating the alcohols and aldehydes known to those skilled in the art may be used. Common separating techniques which are used are fractional distillation, selective absorption and the like.

The mixtures may be separated into alcohosl and aldehydes; the alcohols and aldehydes may further be separated into their isomers, if desired.

Having fully described the novel process of the present invention and pointed out the usefulness of the products obtained therefrom, the scope of the invention is limited only within the lawful extent of the appended claims.

What is claimed is:

1. A process for preparing aldehydes and mixtures of aldehydes and alcohols wherein the aldehydes predominate, which comprises reacting an olefin having from 2 to 40 carbon atoms with carbon monoxide and water using a catalytic amount of a catalyst which consists essentially of rhodium metal on a carrier at temperatures of from about 75° C. to about 165° C. and at pressures from about 1,000 p.s.i. to about 20,000 p.s.i., said aldehydes and alcohols having one carbon atom more than said olefin.

2. The process of claim 1 wherein said olefin has 6 to 24 carbon atoms.

3. The process of claim 1 wherein said carrier is carbon.

4. The process of claim 1 wherein said temperature is 160° C. and below.

5. The process of claim 1 wherein said reaction is carried out in the presence of a promoter selected from alkyl ketones having up to about 11 carbon atoms and alkyl ethers having from 4 to about 16 carbon atoms.

6. The process of claim 1 wherein said promoter is alkyl ether.

7. The process of claim 1 wherein said promoter is alkyl ketone.

8. The process of claim 7 wherein said ketone is acetone

9. The process of claim 7 wherein said carrier is carbon.

10. The process of claim 1 wherein said olefin is a monoolefin.

11. The process of claim 10 wherein said olefin is selected from hexene-1 and dodecene-1, said catalyst is 1–5% by weight rhodium on carbon and said promoter is acetone, and said temperature is about 150° C. to about 160° C.

12. A process for preparing alcohols and mixtures of alcohols and aldehydes wherein the alcohols predominate, which comprises reacting an olefin having from 2 to 40 carbon atoms with carbon monoxide and water using a catalytic amount of a catalyst which consists essentially of rhodium metal on a carrier at temperatures of from about 175° C. to about 300° C. and at pressures from about 1,000 p.s.i. to about 20,000 p.s.i., said alcohols and aldehydes having one carbon atom more than said olefin.

13. The process of claim 12 wherein said olefin has from 6 to 24 carbon atoms.

14. The process of claim 12 wherein said carrier is carbon.

15. The process of claim 12 wherein said temperature is 175° C. and above.

16. The process of claim 12 wherein said reaction is carried out in the presence of a promoter selected from alkyl ketones having up to about 11 carbon atoms and alkyl ethers having from 4 to about 16 carbon atoms.

17. The process of claim 16 wherein said promoter is alkyl ketone.

18. The process of claim 17 wherein said ketone is acetone.

19. The process of claim 16 wherein said promoter is alkyl ether.

20. The process of claim 17 wherein said carrier is carbon.

21. The process of claim 12 wherein said olefin is a monoolefin.

22. The process of claim 21 wherein said olefin is selected from hexene-1 and dodecene-1, said catalyst is 1–5% by weight rhodium on carbon, said promoter is acetone, and said temperature is about 175° C. to about 250° C.

References Cited

UNITED STATES PATENTS

| | | | |
|---|---|---|---|
| 3,020,314 | 2/1962 | Alderson | 260—604 |
| 2,743,298 | 4/1956 | Busk | 260—604 |

FOREIGN PATENTS

| | | | |
|---|---|---|---|
| 801,734 | 9/1958 | Great Britain | 260—604 |

BERNARD HELFIN, Primary Examiner

R. H. LILES, Assistant Examiner

U.S. Cl. X.R.

252—447; 260—526, 535, 598, 602, 617, 633, 635

PO-1050
(5/69)

UNITED STATES PATENT OFFICE
CERTIFICATE OF CORRECTION

Patent No. 3,557,219          Dated  January 19, 1971

Inventor(s)  Lawrence J. Kehoe et al

It is certified that error appears in the above-identified patent and that said Letters Patent are hereby corrected as shown below:

Column 10, line 26 - Claim 6 -- "1" should be -- 5 --

Column 10, line 28 - Claim 7 -- "1" should be -- 5 --

Signed and sealed this 13th day of April 1971.

(SEAL)
Attest:

EDWARD M. FLETCHER, JR.
Attesting Officer

WILLIAM E. SCHUYLER, JR.
Commissioner of Patents